United States Patent

Padovani et al.

Patent Number: 5,372,427
Date of Patent: Dec. 13, 1994

[54] TEMPERATURE SENSOR

[75] Inventors: Francois A. Padovani, Westwood, Mass.; Tim H. McMains, Lexington; Mitchell R. Rowlette, Berea, both of Ky.

[73] Assignee: Texas Instruments Incorporated, Dallas, Tex.

[21] Appl. No.: 812,232

[22] Filed: Dec. 19, 1991

[51] Int. Cl.$^5$ .............................................. G01K 7/22
[52] U.S. Cl. ................................. 374/185; 338/22 R; 374/208
[58] Field of Search ............... 374/185, 183, 163, 208; 338/22 R, 28, 30

[56] References Cited

U.S. PATENT DOCUMENTS

| | | | |
|---|---|---|---|
| 3,147,457 | 9/1964 | Gill et al. | 374/163 |
| 3,508,185 | 4/1970 | Tulchinsky | 374/185 |
| 3,754,201 | 8/1973 | Adams | 374/185 |
| 3,835,434 | 9/1974 | Kahn | 338/22 R |
| 4,037,082 | 7/1977 | Tamada et al. | 338/22 R |
| 4,129,848 | 12/1978 | Frank et al. | 374/185 |
| 4,242,659 | 12/1980 | Baxter et al. | 374/185 |
| 4,424,507 | 1/1984 | Nagai et al. | 338/28 |
| 4,560,973 | 12/1985 | Grimm et al. | 338/28 |
| 4,627,744 | 12/1986 | Brixy et al. | 374/185 |
| 4,750,497 | 6/1988 | Suzuki et al. | 374/135 |
| 4,810,563 | 3/1989 | DeGree et al. | 428/209 |
| 4,841,274 | 6/1989 | Yagher, Jr. et al. | 374/208 |
| 5,046,857 | 9/1991 | Metzger | 374/208 |

FOREIGN PATENT DOCUMENTS

| | | | |
|---|---|---|---|
| 3127726 | 2/1983 | Germany | 374/185 |
| 1503872 | 3/1978 | United Kingdom | 374/185 |

Primary Examiner—William A. Cuchlinski, Jr.
Assistant Examiner—G. Bradley Bennett
Attorney, Agent, or Firm—Russell E. Baumann; Richard L. Donaldson; René E. Grossman

[57] ABSTRACT

A low-cost, highly-responsive temperature sensor has a thermistor element surface-mounted in a circuit defined by an electrically-conducting layer of a three-layer circuit substrate to be in close thermal coupling to a metal base layer on an opposite side of the substrate. The base layer is adapted to be disposed in heat-collecting relation to a surface whose temperature is to be monitored. An intermediate layer of the substrate has a binder electrically insulating the thermistor from the metal base layer and has thermally-conducting particles dispersed in the binder to improve thermal coupling of the thermistor to the heat-collecting substrate base layer. The circuit defines terminal pads surface-mounting the thermistor element at one end of the substrate and defines interconnected terminal pads at an opposite end of the substrate which are connected to device lead wires in substantial thermal isolation from the thermistor element.

6 Claims, 3 Drawing Sheets

TEMPERATURE SENSOR

BACKGROUND OF THE INVENTION

The field of the invention is that of temperature sensing devices and the invention relates more particularly to a low-cost but highly-responsive temperature sensor which provides an electrical signal corresponding to a sensed temperature.

A variety of conventional, thermally-responsive elements such as thermistors and the like are available for providing an electrical signal corresponding to a sensed temperature. Many of the thermally-responsive elements which are commercially available are made at low cost by volume manufacturing techniques. However, it is then found that adapting the thermally-responsive elements to particular temperature-sensing applications and electrically connecting the elements in a circuit to permit use of the element output signal in a control circuit or the like tends in result in substantial mounting expense and frequently results in some loss of responsiveness to temperature changes.

BRIEF SUMMARY OF THE INVENTION

It is an object of the invention to provide a novel and improved temperature sensor; to provide such a temperature sensor which is characterized by low cost; to provide such a low-cost temperature sensor which is highly responsive to temperature changes; and to provide such low-cost, highly-responsive temperature sensors which are versatile and inexpensive to use in different sensor applications without loss of sensor performance characteristics.

Briefly described, the novel and improved temperature sensor of the invention comprises a conventional three-layer electrical circuit substrate of the type having a base layer of metal material of relatively high thermal conductivity at one side of the substrate, having an electrically conducting metal layer at an opposite side of the substrate, and having an intermediate layer of electrically insulating material secured in heat-transfer relation between the base layer and the electrically-conducting metal layers of the substrate. Preferably the intermediate substrate layer comprises a binder material which adheres directly to the base and electrically-conducting substrate layers and also comprises a multiplicity of particles of thermally-conducting alumina or the like dispersed in the binder material for enhancing thermal coupling between the electrically-conducting and base layers of the substrate. The electrically-conducting layer is deposited or etched in a particular pattern to define an electrical circuit on the substrate. Preferably the electrically-conducting layer defines a first pair of metal terminal pads on said opposite substrate side at or adjacent to one end of the substrate, also defines an additional pair of metal terminal pads on the same substrate side adjacent an opposite end of the substrate, and defines relatively long and narrow metal circuit paths interconnecting respective ones of the two pairs of the terminal pads.

An element responsive to temperature to provide an electrical signal corresponding to the temperature is then surface-mounted to the first pair of metal terminal pads at one end of the substrate, and lead wires are electrically connected to the additional pair of metal terminal pads. Preferably, for example, a conventionally available thermistor having metal input and output terminals disposed at opposite ends of the thermistor has the thermistor terminals soldered directly to respective terminal pads of the first pair of pads provided at one end of the substrate and has the lead wires soldered to other pair of terminals. A housing is preferably secured to the substrate and is sealed to the substrate and to the lead wires for enclosing the thermally-responsive element while exposing the metal base layer of the circuit substrate to be disposed in heat-transfer relation to a surface whose temperature is to be monitored.

In that arrangement, the substrate and thermally-responsive element are each available at low cost. The thermally-responsive element is easily mounted on one pair of the substrate terminal pads by soldering or the like but is thereby disposed in very close thermal coupling to the metal base layer of the substrate. The substrate base layer serves as a heat-collecting layer for receiving heat from a surface whose temperature is to be monitored for transferring that temperature to the thermally-responsive element in a highly efficient manner. The sensor lead wires are also easily and economically connected to the additional pair of metal terminal pads provided in the circuit layer of the substrate and are thereby connected to the thermally-responsive element in an economical way which thermally isolates the element to a substantial extent from any temperature effects which might be carried along the lead wires. A housing is also easily and economically attached in sealed relation to the substrate and lead wires where desired for enclosing the thermally-responsive element. As a result, the sensor is easily adapted for use in many different temperature-sensing applications, utilizes inexpensive components which are inexpensively assembled and mounted, and achieves improved response to temperature change by close thermal coupling of the thermally-responsive element to the heat-collecting metal substrate base and by isolating thermal effects of the lead wires from the thermally-responsive element.

DESCRIPTION OF THE DRAWINGS

Other objects, advantages and details of the novel and improved temperature sensor of the invention appear in the following detailed description of preferred embodiments of the invention, the detailed description referring to the drawings in which.

DESCRIPTION OF THE PREFERRED EMBODIMENTS

Figure 1:
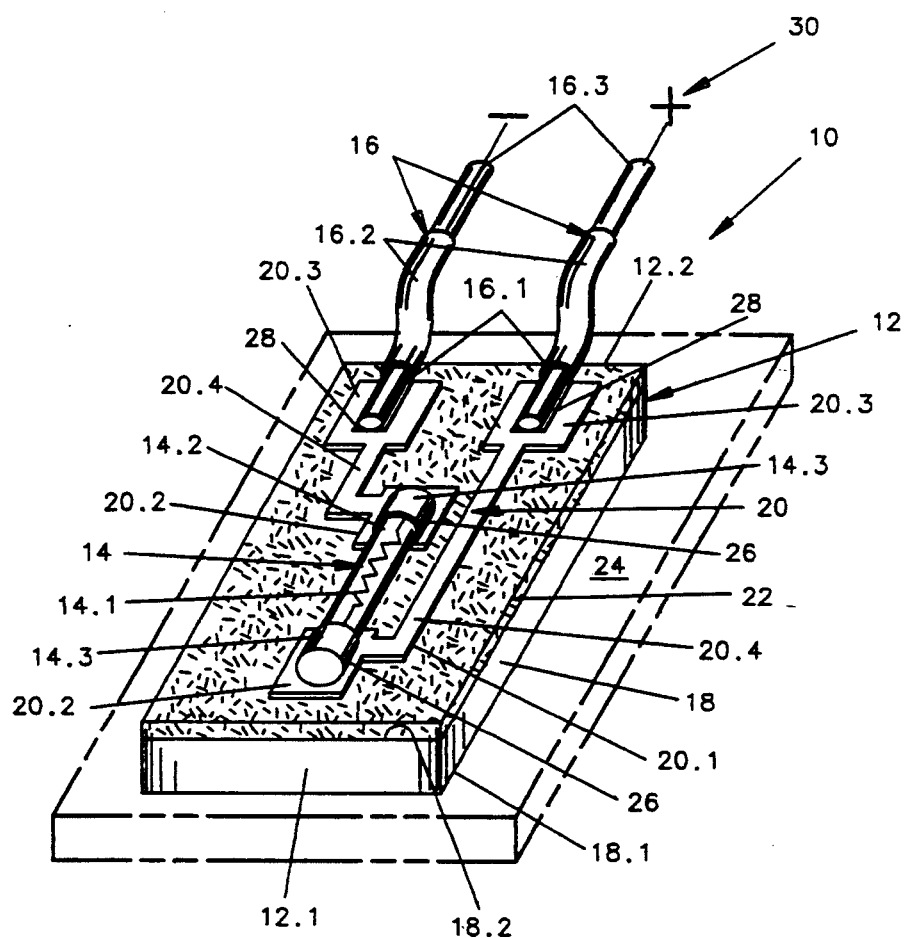
FIG. 1 is a perspective view of a preferred embodiment of the temperature sensor of the invention.

Referring to the drawings, 10 in FIG. 1 indicates a preferred embodiment of the novel and improved temperature sensor device of the invention which is shown to include an electrical circuit substrate 12 having a thermally-responsive element 14 mounted on the substrate to provide an electrical signal corresponding to a temperature sensed by the device and having sensor lead wires 16 extending from the sensor for electrically connecting the device in a temperature-monitoring circuit or the like outside the sensor device.

In a preferred embodiment of the invention, the electrical circuit substrate 12 has three layers 18, 20 and 22. The substrate layer 18 extending along one side of the substrate is formed of a metal material such as copper or aluminum or the like of relatively high thermal conductivity and is typically provided flat and with sufficient thickness to be relatively rigid or at least shape-retaining. One side 18.1 of the metal substrate base layer is adapted to be disposed against a surface 24 whose temperature is to be monitored as is diagrammatically indicated in FIG. 1. The substrate layer 20 is formed of an electrically-conducting metal material such as copper or aluminum or the like and is typically much thinner than the metal base layer 18 of the substrate. The substrate layer 22 is formed of an electrically insulating material which is secured to the metal substrate layers 18 and 20 intermediate the metal layers for electrically insulating the electrically-conducting layer 20 from the metal base layer 18. Preferably the electrically-insulating intermediate layer 22 comprises an electrically-insulating organic binder material such as a thermoplastic which is directly adherent to an opposite side 18.2 of the metal base layer and to one corresponding side 20.1 of the electrically-conducting substrate layer. Preferably the intermediate layer has a multiplicity of thermally-conducting particles of alumina or the like dispersed in the binder material (as is diagrammatically indicated in FIG. 1 by stippling of the substrate layer 22) for enhancing thermal conductivity through the electrically insulating layer 22 between the metal substrate layers 18 and 20. As such three-layer electrical circuit substrates are well-known and are described in detail in U.S. Pat. No. 4,810,563, the disclosure of which is incorporated herein by this reference, the general characteristics of the substrate 12 are not further described herein and it will be understood that the substrate includes a thermally-conducting metal base layer along one substrate side, an electrically-conducting metal layer along an opposite substrate side, and an electrically-insulating intermediate layer, the intermediate layer preferably comprising an organic binder adherent to each of the metal layers and accommodating a dispersion of thermally-conducting particles through the binder.

Preferably the electrically-conducting layer 20 of the substrate is initially incorporated as a thin metal sheet or film and is then etched or otherwise formed to define an electrical circuit on the substrate to be electrically insulated by the layer 22 from the metal base layer 18 of the substrate. The layer 22 is typically thin and has a thickness selected to provide a desired level of electrical insulation of the layer 20 from the metal base 18. Preferably the substrate layer 20 defines a pair of metal terminal pads 20.2 at or adjacent one end 12.1 of the substrate, defines an additional pair of metal terminal pads 20.3 at or adjacent an opposite end 12.2 of the substrate spaced from the terminal pads 20.2, and defines a pair of relatively long and narrow metal circuit pads 20.4 which extend between the respective terminal pads 20.2 and corresponding terminal pads 20.3 on the substrate. In that arrangement, the metal terminal pads 20.2 are thermally isolated to a substantial extent from the metal terminal pads 20.3 by the substantial spacing between the pairs of terminal pads. In a preferred embodiment as shown in FIG. 1, the pads 20.2 are spaced along a longitudinal axis of the device 10 near the substrate end 12.1.

In accordance with the invention, the thermally-responsive element 14 is surface-mounted on the pair of terminal pads 20.2 at one end of the substrate. Preferably, for example, the thermally-responsive element comprises a thermistor such as a resistor 14.1 of negative temperature coefficient of resistivity which is enclosed within a cylindrical glass sleeve 14.2 and electrically connected at its opposite ends to input and output terminals 14.3 comprising metal terminal cups fitted in sealed relation over respective opposite ends of the glass sleeve. Such a thermally-responsive thermistor element is commercially available from the Keystone Carbon Co. under the designation Style 2 Glass-Encapsulated Thermistor. The metal terminal cups are soldered directly to respective ones of the pair of metal terminal pads 20.2 defined by the electrically-conducting substrate layer 20 as is indicated at 26. The pair of lead wires 16 each have metal wire ends 16.1 which are soldered directly to respective ones of the additional metal terminal pads 20.3 as is indicated at 28, are coated over a substantial part of their length with an electrically insulating wire coating 16.2, and extend from the substrate to permit opposite ends 16.3 of the leads to be adapted to be connected in a temperature-monitoring electrical circuit or the like as is diagrammatically indicated at 30 in FIG. 1.

In that arrangement, the substrate 12 and thermally-responsive element 14 are each of inexpensive, commercially available structure, and are each easily and economically assembled together to form the temperature sensor 10. The device is adapted to be made in volume in automated manufacture. The thermally-responsive element 14 is securely connected to the electrically-conducting substrate layer 20 defining the sensor circuit, and the surface-mounted element is disposed in close thermal coupling to the substrate base layer 18 to be easily disposed in close heat-transfer relation to a surface 24 whose temperature is to be monitored. That is, the metal substrate layer 18 serves to collect heat from the surface 24 and to conduct that heat through the electrically-insulating substrate layer 22 to the metal substrate layer 20 and to the metal terminal cups of the thermally-responsive element 14 via the solder 26, the thermally-conducting particles of aluminum or the like in the intermediate facilitating and enhancing this heat transfer. The ends 16.3 of the sensor lead wires are adapted to be easily connected into a temperature-monitoring circuit or the like, and the spacing of the terminal pads 20.3 from the terminal pads 20.2 thermally isolate the thermally-responsive element 14 from any heat transfer or withdrawal which might otherwise tend to be effected along the length of the lead wires 16.

Figure 2:
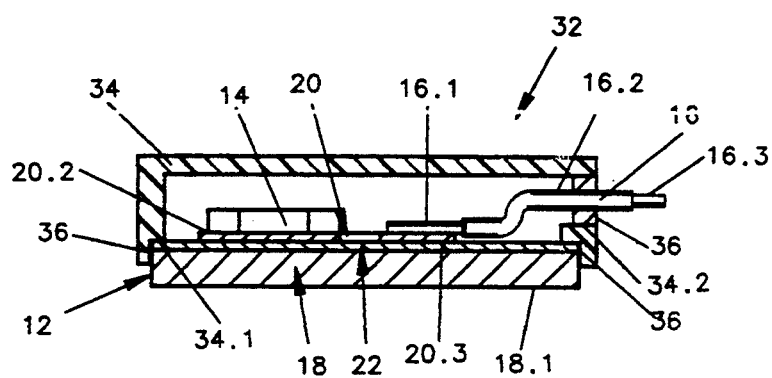
FIG. 2 is a section view to relatively smaller scale along a longitudinal axis of another preferred embodiment of the invention.

In another preferred embodiment of the invention as indicated at 32 in FIG. 2, wherein corresponding components are identified with corresponding reference numerals, a thermally-insulating housing 34 is secured to the substrate 12 and to the lead wires 16 for enclosing the thermally-responsive element 14 while leaving the metal substrate base layer 18 exposed to be disposed in close heat-transfer relation to a surface 24 to be temperature-monitored. Preferably, for example, the housing comprises a cup-shaped body of glass-filled nylon material or the like having a rim 34.1 fitted to the substrate around the thermally-responsive element and having an opening 34.2 fitted around the lead wires 16 leaving the lead wire ends 16.3 extending from the housing. Preferably an epoxy adhesive or the like seals the housing rim to the substrate and seals the lead wire insulating coatings to the housing within the housing opening as indicated at 36 in FIG. 2.

Figure 3:
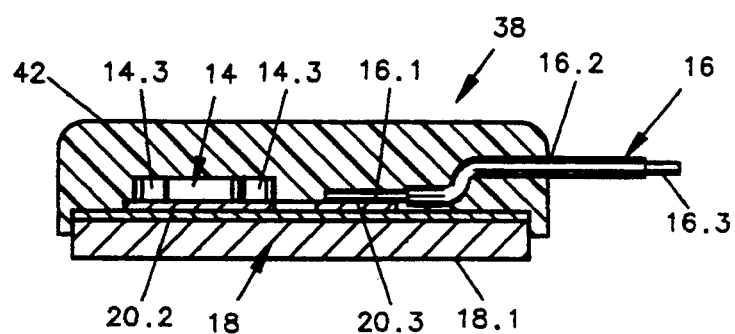
FIGS. 3 and 4 are section views similar to FIG. 2 illustrating alternate preferred embodiments of the invention.
Figure 4:
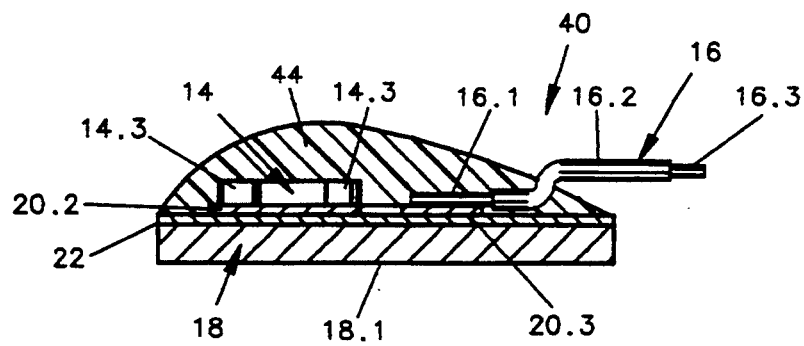

In other preferred embodiments of the invention as illustrated at 38 and 40 respectively in FIGS. 3 and 4, wherein corresponding components are identified with corresponding reference numerals, a plastic encapsulating material 42 as shown in FIG. 3 or an epoxy potting compound 44 as shown in FIG. 4 are formed around the thermally-responsive element 14 and the lead wires 16 in adherent relation to the substrates 12 for enclosing the elements 14 in sealed relation within the temperature sensors while disposing the metal substrate base layers 18 to be disposed in heat-transfer relation to a temperature-monitored surface 24.

Various other modifications of the temperature sensors as above-described are possible within the scope of the invention. For example, the base layer of the sensor substrate is desirably formed of a composite metal material, typically a metal composite having portions of one metal of relatively high thermal conductivity extending between the opposite sides 18.1 and 18.2 of the base layer through portions of another metal of relatively low coefficient of thermal expansion. Further, other well-known thermally-responsive elements such as ceramic thermistors and the like are used in the temperature sensor within the scope of the invention.

Figure 5:
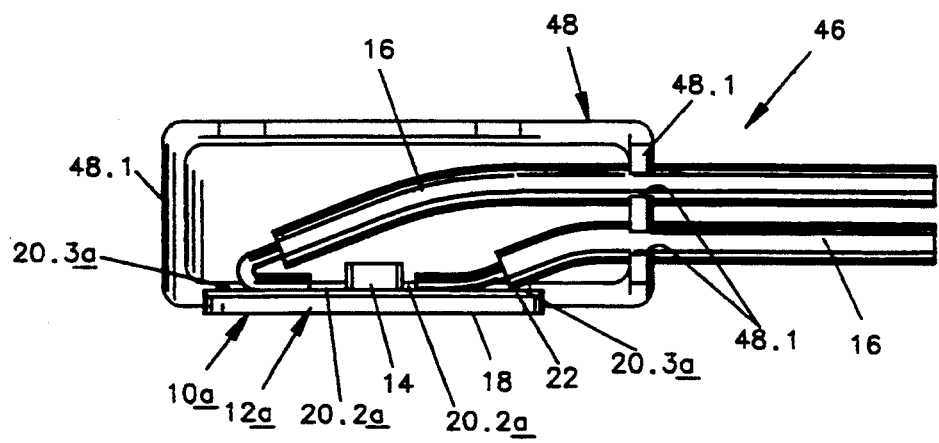
FIG. 5 is a side elevation view similar to FIG. 2 illustrating another preferred embodiment of the invention.
Figure 6:
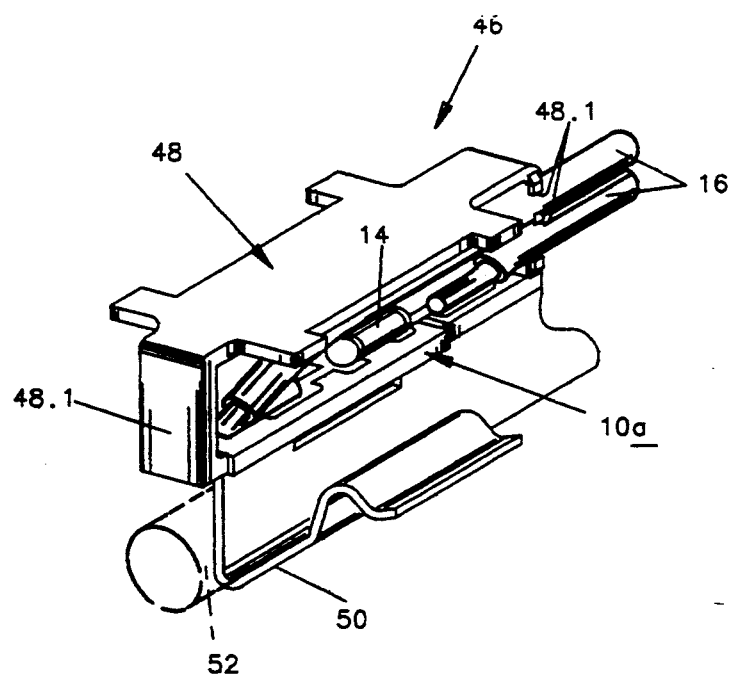
FIG. 6 is a perspective view of the device of FIG. 5.
Figure 7:
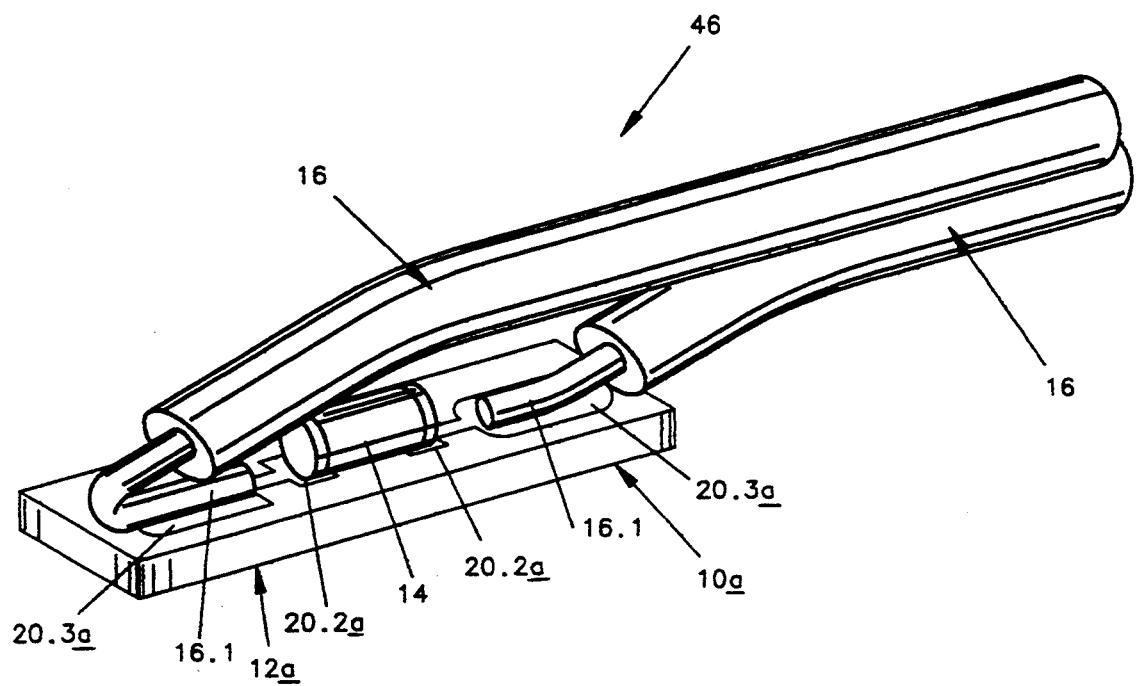
FIG. 7 is a perspective view of the sensor element used in the device of FIGS. 5–6.

In another preferred embodiment of the invention as indicated at 46 in FIGS. 5–7, wherein corresponding components are identified with corresponding reference numerals, a C-shaped housing 48 of a nylon material or the like has ends 48.1 of the C-shape adhered to ends of a substrate 12a in a device 10a as best shown with reference to FIG. 7 to protect the thermally responsive element 14 in the device. In that device 10a, the terminal pads 20.2a are electrically connected to the terminals 14.3 of the thermistor and the terminal pads 20.3a connected to the lead wires are disposed at respective opposite ends of the substrate 12a. The lead wires extend from a common end of the device as shown and one of the lead wires passes over the thermistor in spaced relation to it. In that arrangement, the wire insulation tends to prevent heating effects from the wires being transferred to the thermistor and, as in the previous embodiments, the large volume of the heat-collecting base of the substrate dominates heat-transfer to the thermistor so the thermistor responds primarily to theat-transfered from the surface 24 to be monitored. The housing has grooves 48.2 formed in an edge of one end of the C-shape receiving the lead wires therein. If desired the grooves 48.2 have widths which are somewhat reduced at the open ends of the grooves so that, when the lead wires are pressed into the grooves, they are retained in the grooves by the smaller open groove ends. If desired, a metal spring clip 50 of stainless steel or the like is attached to the device 46 to grip a tube, for example, as indicated by broken lines 52 in FIG. 5 to secure the base layer 18 in close heat-collecting relation to the tube along a line extending along and closely adjacent to the temperature-responsive element 14. If desired, the space within the C-shape is filled with a potting compound or the like (not shown).

It should be understood that although particular embodiments of the invention are illustrated herein, the invention includes all modifications and equivalents of the disclosed embodiments falling within the scope of the appended claims.

We claim:

1. A low cost highly responsive surface temperature sensor comprising a tri-layer substrate having a single heat-collecting base layer of metal material of relatively high thermal conductivity having a bottom side thereof to be disposed against a surface whose temperature is to be monitored, having an intermediate layer of electrically-insulating organic binder material with thermally-conducting particles dispersed in the binder material having a bottom side thereof secured to an opposite top side of the metal base layer, and having an electrically-conducting metal layer secured to an opposite top side of the intermediate layer defining an electrical circuit with metal terminal pads at one end of the top opposite intermediate layer side and additional metal terminal pads in the circuit at generally the other end of the top opposite intermediate layer side and an element responsive to temperature to provide an electrical signal corresponding to the temperature, the element having input and output terminals surface-mounted to said metal terminal pads defined in the circuit by the electrically-conducting layer to provide the electrical signal to the circuit and said additional metal terminal pads being connected to lead wires for connecting the sensor circuit outside the sensor while thermally isolating the lead wires to a substantial extent from the temperature-responsive element.

2. A temperature sensor according to claim 1 having lead wires connected to the additional metal terminal pads and extending from the substrate, and having a thermally-insulating housing sealed to the lead wires and to the substrate around the thermally-responsive element to enclose the element while exposing said bottom side of the base layer to be disposed against the surface whose temperature is to be monitored.

3. A low-cost highly-responsive surface temperature sensor comprising a substrate having a flat, rigid single heat-collecting base layer of metal material of relatively high thermal conductivity having a bottom side thereof to be disposed against a surface whose temperature is to be monitored, having an intermediate layer of electrically-insulating material having a bottom side thereof adherent to an opposite top side of the metal base layer, the intermediate layer including a binder material adhering to the intermediate layer to the base and thermally-conducting particles dispersed in the binder material enhancing thermal conductivity through the intermediate layer, and having an electrically-conducting metal layer relatively much thinner than the metal base layer adhered to an opposite top side of the intermediate layer by the binder material defining first metal terminal pads at one end of the opposite top intermediate layer side, additional metal terminal pads at an opposite end of the opposite top intermediate layer side, and metal electrical circuit paths interconnecting the first and additional metal terminal pads; an element responsive to temperature to provide an electrical signal corresponding to the temperature, the element having metal input and output terminals directly soldered to the first metal terminal pads; lead wires connected to the additional metal terminal pads and extending from the substrate; and a thermally-insulating housing sealed to the lead wires and to the substrate around the thermally-responsive element to enclose the element while exposing said bottom base layer side to be disposed against a surface whose temperature is to be monitored.

4. A temperature sensor according to claim 3 wherein the temperature-responsive element comprises a thermistor having metal input and output terminals spaced at opposite ends of the thermistor soldered directly to the first metal terminal pads defined by the electrically-conducting substrate layer.

5. A temperature sensor according to claim 4 wherein the housing comprises a molded plastic member having a rim fitted against the substrate around the element and having an opening through which the lead wires extend from the additional substrate terminal pads, and adhesive means sealing the housing rim to the substrate and the lead wires to the housing in the housing opening.

6. A temperature sensor according to claim 4 wherein the housing comprises an electrically insulating potting material adherent to the substrate and lead wires around the thermally-responsive element.

* * * * *